US007636869B2

(12) United States Patent
Lian et al.

(10) Patent No.: US 7,636,869 B2
(45) Date of Patent: Dec. 22, 2009

(54) PROGRAM DYNAMICALLY BURNT SYSTEM AND METHOD

(75) Inventors: Wen-Chuan Lian, Guangdong (CN); Duo Liu, Guangdong (CN)

(73) Assignees: Hong Fu Jin Precision Industry (Shen Zhen) Co., Ltd., Longhua Town, Bao'an District, Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 427 days.

(21) Appl. No.: 11/616,897

(22) Filed: Dec. 28, 2006

(65) Prior Publication Data
US 2007/0260923 A1   Nov. 8, 2007

(30) Foreign Application Priority Data
Apr. 21, 2006  (CN) .................. 2006 1 0060412

(51) Int. Cl.
*G06F 11/00* (2006.01)
(52) U.S. Cl. ........................................ 714/25
(58) Field of Classification Search .................... 714/25, 714/27, 31, 38, 45, 51
See application file for complete search history.

(56) References Cited

U.S. PATENT DOCUMENTS

| 4,300,192 A * | 11/1981 | Couleur et al. ............... 711/153 |
| 4,843,541 A * | 6/1989 | Bean et al. .................... 710/36 |
| 6,377,897 B1 * | 4/2002 | Boyington et al. ............ 702/81 |
| 7,036,118 B1 * | 4/2006 | Ulery et al. .................. 717/159 |
| 2004/0255178 A1 * | 12/2004 | Hung ............................ 714/1 |
| 2006/0123404 A1 * | 6/2006 | O'Brien et al. ............. 717/140 |

* cited by examiner

*Primary Examiner*—Nadeem Iqbal
(74) *Attorney, Agent, or Firm*—Winston Hsu

(57) ABSTRACT

A program dynamically burnt method is provided. The method includes the following steps: dividing a system program into a first part system program and a second part system program; linking a diagnostic program, the second system program and the first system program orderly to form an integration program; burning the integration program to a storage of an electronic apparatus; deleting the diagnostic program from the data storage; and moving the first part system program to occupy address space of the diagnostic program in the data storage.

6 Claims, 3 Drawing Sheets

PROGRAM DYNAMICALLY BURNT SYSTEM AND METHOD

BACKGROUND OF THE INVENTION

1. Field of the Invention

The present invention relates generally to a program dynamically burnt system and method.

2. Description of Related Art

After assembled, an electronic apparatus needs to be tested by a diagnostic program to ensure that components of the electronic apparatus comply with a predetermined standard. After the test, a system program is loaded into the electronic apparatus to allow the electronic apparatus run properly.

Generally, the electronic apparatus uses an embedded OS (operation system) that needs to be burned into a data storage of the electronic apparatus. When powered on, a CPU of the electronic apparatus reads instructions from an address that is predetermined by the manufacturer. Generally, the manufacturer set the CPU to read a first instruction from a starting address, namely, 0X00000000, of the data storage. Commonly, the diagnostic program and the system program are burnt together into the data storage of the electronic apparatus. Before the system program is executed, the diagnostic program is burnt from a starting address of the data storage and the system program follows the diagnose program. after testing, the diagnostic program is deleted from the data storage and the system program is moved up to the address space where the deleted diagnose program was.

Because the system program is larger than the diagnostic program and because each bit of data of the system program needs to be moved up, a long time is required to move up the whole system program. Additionally, during a manufacturing process, the system program and the diagnostic program may probably be modified/updated and burnt into the data storage of the electronic apparatus again and again, thus results in the system program being moved again and again. However, frequent moving of the system program causes damages to the data storage of the electronic apparatus.

Therefore, what is needed is a system and method for burning a program into an electronic apparatus which need not to move all the program when a move of the program is needed.

SUMMARY OF THE INVENTION

A program dynamically burnt system is provided. The system includes a computer and an electronic apparatus. The computer includes a computer storage device and a CPU, and the electronic apparatus includes a MCU and an apparatus storage device. The computer storage device is for storing a system program and a diagnosis program. The CPU of the computer comprises a program partition module, a program linkage module, and a program burning module. The program partition module is for dividing the system program into a first part system program and a second part system program. The program linkage module is for linking the diagnostic program, the second system program and the first system program orderly to form an integration program. The program burning module is for burning the integration program to the apparatus storage device of the electronic apparatus. The MCU of the electronic apparatus includes a data deletion module and a data moving module. The data deletion module is for deleting the diagnostic program from the apparatus storage device. The data moving module is for moving the first part system program to occupy address space of the diagnostic program in the apparatus storage device.

A program dynamically burnt method is provided. The method includes the following steps: dividing a system program into a first part system program and a second part system program; linking a diagnostic program, the second system program and the first system program orderly to form an integration program; burning the integration program to a storage of an electronic apparatus; deleting the diagnostic program from the data storage; and moving the first part system program to occupy address space of the diagnostic program in the data storage.

Other advantages and novel features will be drawn from the following detailed description of the preferred embodiment with reference to the attached drawings, in which:

DETAILED DESCRIPTION OF THE INVENTION

Figure 1:
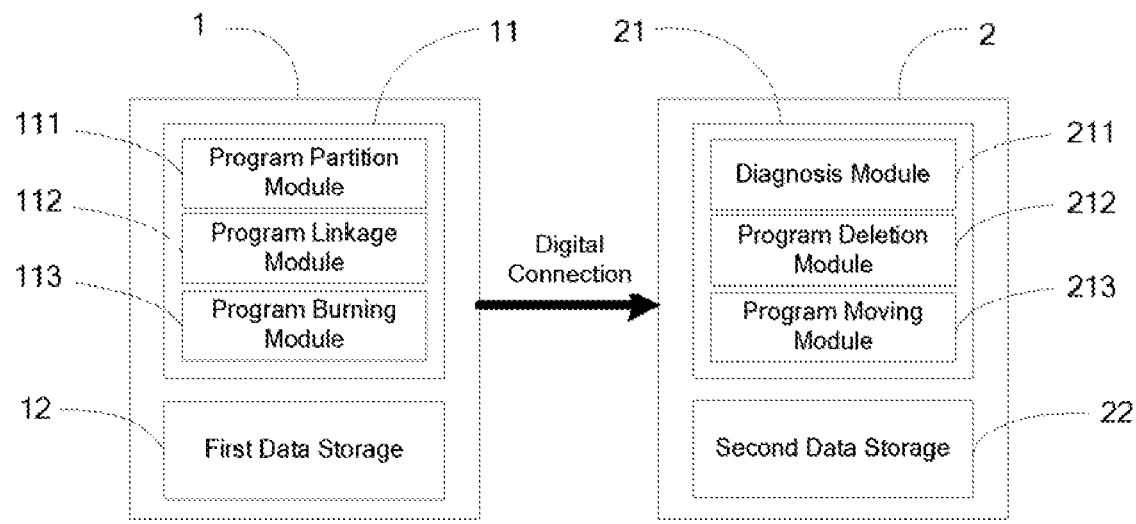
FIG. 1 is a hardware infrastructure schematic diagram of a program dynamically burnt system.

FIG. 1 is a hardware infrastructure schematic diagram of a program dynamically burnt system. The system includes a computer 1 and an electronic apparatus 2. The electronic apparatus 2 and the computer 1 can be connected together through digital interfaces. The computer 1 includes a centre processing unit (CPU) 11 and a computer storage device 12, and the electronic apparatus 2 includes a microcontroller unit (MCU) 21 and an apparatus storage device 22.

The computer storage device 12 is preconfigured with a system program and a diagnostic program. The system program is necessary for the electronic apparatus to run/function properly and includes a boot program, an OS file system, and a kernel of an embedded OS. The diagnostic program is for detecting whether components of the electronic apparatus comply with a predetermined standard. Generally, the diagnostic program and the system program should be burnt into the electronic apparatus together, the diagnostic program is invoked/executed before the system program to ensure that all the components of the electronic apparatus 2 are in a good status to run/invoke/execute the system program.

Figure 2:
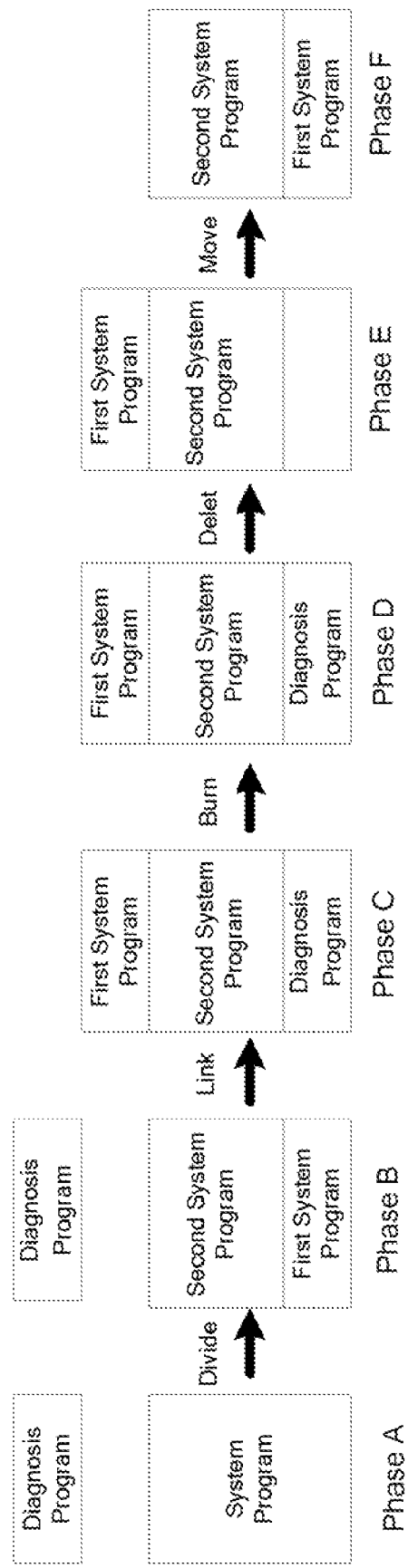
FIG. 2 is a schematic diagram showing dynamically burning the program into an electronic apparatus.
Figure 3:
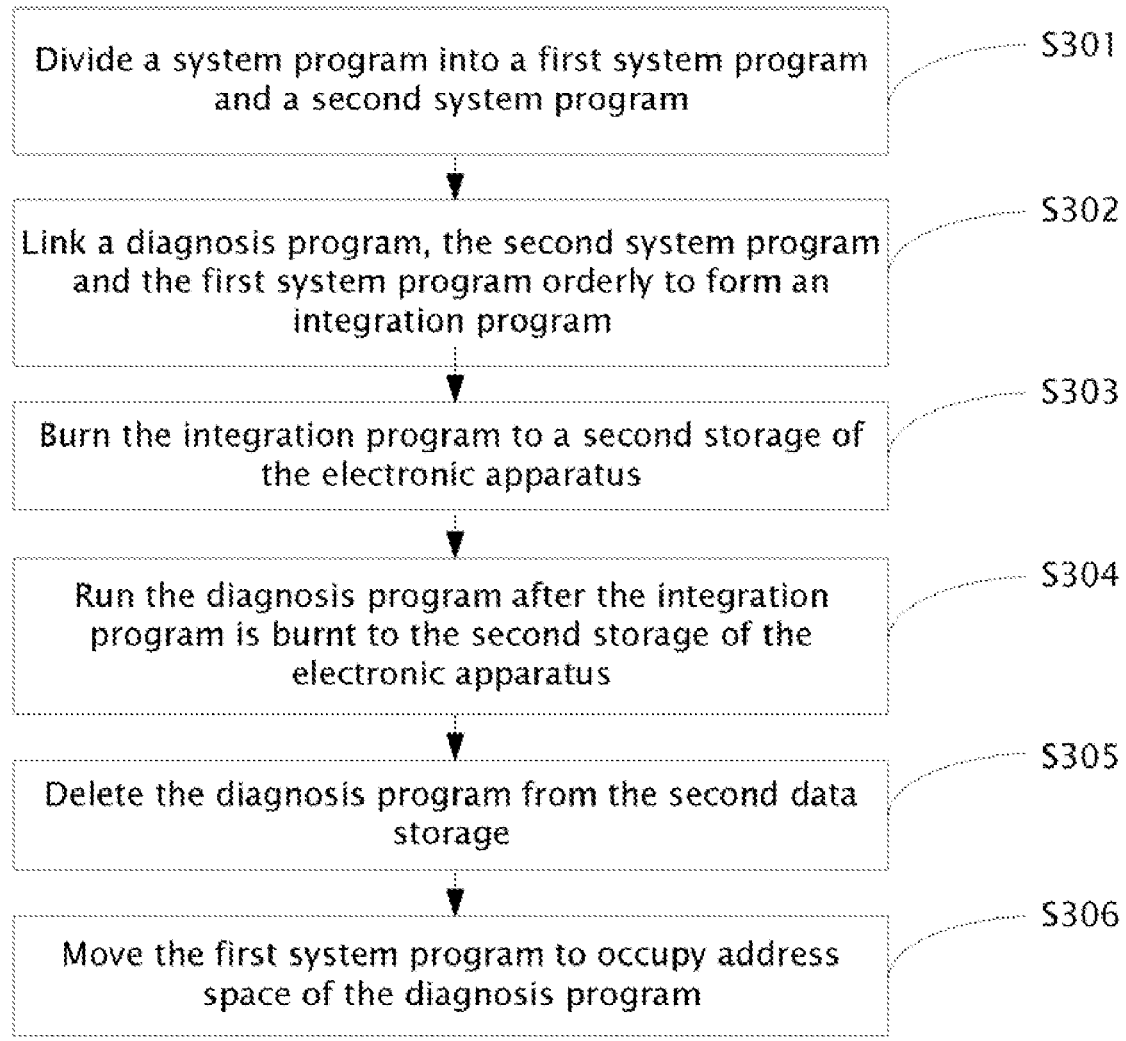
FIG. 3 is a flow chart of a preferred method for dynamically burning a program by utilizing the system of FIG. 1.

The CPU 11 of the computer 1 includes a program partition module 111, a program linkage module 112, and a program burning module 113. FIG. 2 and the FIG. 3 are respectively a schematic diagram and a flow chart of a preferred method for dynamically burning the system program and the diagnostic program to the electronic apparatus 2. The system program and the diagnostic program are initially stored/preconfigured in the computer storage device 12 as shown in phase A of FIG. 2. The program partition module 111 breaks up the system program into a first part system program and a second part system program, as shown at phase B of FIG. 2 and step S301 of FIG. 3. The first part system program has a size near equal to that of the diagnostic program. The program linkage module 112 links the diagnostic program, the second system program and the first system program in that order to form an integration program, as shown at phase C of FIG. 2 and step 302 of FIG. 3. The program burning module 113 burns the integration program sequentially to the apparatus storage device 22 of the electronic apparatus 2, as shown at phase D of FIG. 2 and step S303 of FIG. 3. The integration program is burnt to the electronic apparatus 2 from a start address of the apparatus storage device 22.

The MCU 21 of the electronic apparatus 2 includes a diagnostic module 211, a data deletion module 212, and a data moving module 213. The diagnostic module 211 runs/invokes/executes the diagnostic program after the integration program is burnt to the apparatus storage device 22 and diagnoses whether the components of the electronic apparatus 2 complies with a predetermined standard as shown at step 304 of FIG. 3. After the diagnostic program diagnosis the apparatus, The data deletion module 212 deletes the diagnostic program from the apparatus storage device 22, as shown at phase E of FIG. 2 and step S305 of FIG. 3. Then, The data moving module 213 moves the first part system program to the address space previously occupied by the diagnostic program, as shown at phase F of FIG. 2 and step S306 of FIG. 3. As a result, the first system program is then stored at the starting address of the electronic apparatus 2.

Although the present invention has been specifically described on the basis of a preferred embodiment, the invention is not to be construed as being limited thereto. Various changes or modifications may be made to the embodiment without departing from the scope and spirit of the invention.

What is claimed is:

1. A program dynamically burnt system, comprising a computer and an electronic apparatus, the computer comprising a computer storage device and a CPU (centre processing unit), and the electronic apparatus comprising a MCU (microcontroller unit) and an apparatus storage device, wherein;

the computer storage device is for storing a system program and a diagnosis program;

the CPU of the computer comprises:

a program partition module for dividing the system program into a first part system program and a second part system program;

a program linkage module for linking the diagnostic program, the second system program and the first system program orderly to form an integration program; and a program burning module for burning the integration program to the apparatus storage device of the electronic apparatus; and the MCU of the electronic apparatus comprises:

a data deletion module for deleting the diagnostic program from the apparatus storage device; and a data moving module for moving the first part system program to occupy address space of the diagnostic program in the apparatus storage device.

2. The system as described in claim 1, wherein the first part system program has a size equal to that of the diagnostic program.

3. The system as described in claim 1, wherein the electronic apparatus further comprises a diagnostic module for running the diagnostic program after the integration program is burnt to the apparatus storage device.

4. A program dynamically burnt method, comprising the steps of:

dividing a system program into a first part system program and a second part system program;

linking a diagnostic program, the second system program and the first system program orderly to form an integration program;

burning the integration program to a storage of an electronic apparatus;

deleting the diagnostic program from the data storage; and moving the first part system program to occupy address space of the diagnostic program in the data storage.

5. The method as described in claim 4, wherein the first part system program has a size equal to that of the diagnostic program.

6. The method as described in claim 4, further comprising the step of running the diagnostic program after the integration program is burnt to the apparatus storage device.

* * * * *